United States Patent [19]

Tolley

[11] 4,178,176

[45] Dec. 11, 1979

[54] RECOVERY OF IRON AND TITANIUM METAL VALUES

[75] Inventor: William K. Tolley, Arlington Heights, Ill.

[73] Assignee: UOP Inc., Des Plaines, Ill.

[21] Appl. No.: 925,901

[22] Filed: Jul. 19, 1978

[51] Int. Cl.$^2$ .................... C21B 15/00; C01G 23/04
[52] U.S. Cl. ................... 75/101 R; 75/1 T; 75/114; 423/82; 423/83; 423/85; 423/86; 423/140; 423/150
[58] Field of Search .............. 423/82, 83, 85, 86; 75/108, 114, 1 T, 101 R

[56] References Cited

U.S. PATENT DOCUMENTS

| | | | |
|---|---|---|---|
| 3,076,692 | 2/1963 | Ruter et al. | 423/83 |
| 3,236,596 | 2/1966 | Zirngibl et al. | 423/83 |
| 3,407,033 | 10/1968 | Ruter et al. | 423/83 |
| 3,529,931 | 9/1970 | Moklebust | 423/86 |
| 3,825,419 | 7/1974 | Chem | 75/101 R |
| 3,859,077 | 1/1975 | Othmer | 75/1 T |
| 3,903,239 | 9/1975 | Berkovich | 423/82 |
| 3,929,962 | 12/1975 | Shiah | 423/83 |

FOREIGN PATENT DOCUMENTS 582579  9/1959  Canada ..................... 423/82

*Primary Examiner*—Herbert T. Carter
*Attorney, Agent, or Firm*—James R. Hoatson, Jr.; Raymond H. Nelson; William H. Page, II

[57] ABSTRACT

Iron metal values and titanium metal values may be recovered from iron and titanium bearing sources such as ilmenite by subjecting the source to a reductive roast followed by leaching of the reduced source with a halogen-containing compound. Thereafter, the iron halide is crystallized and separated from the soluble titanium halides. One portion of the iron halides is subjected to a reducing step to form metallic iron while a second portion is oxidized, the iron oxides being used to precipitate the titanium as titanium dioxide. The titanium dioxide may then be separated and recovered while the liquid portion is recycled to the leaching zone.

9 Claims, 1 Drawing Figure

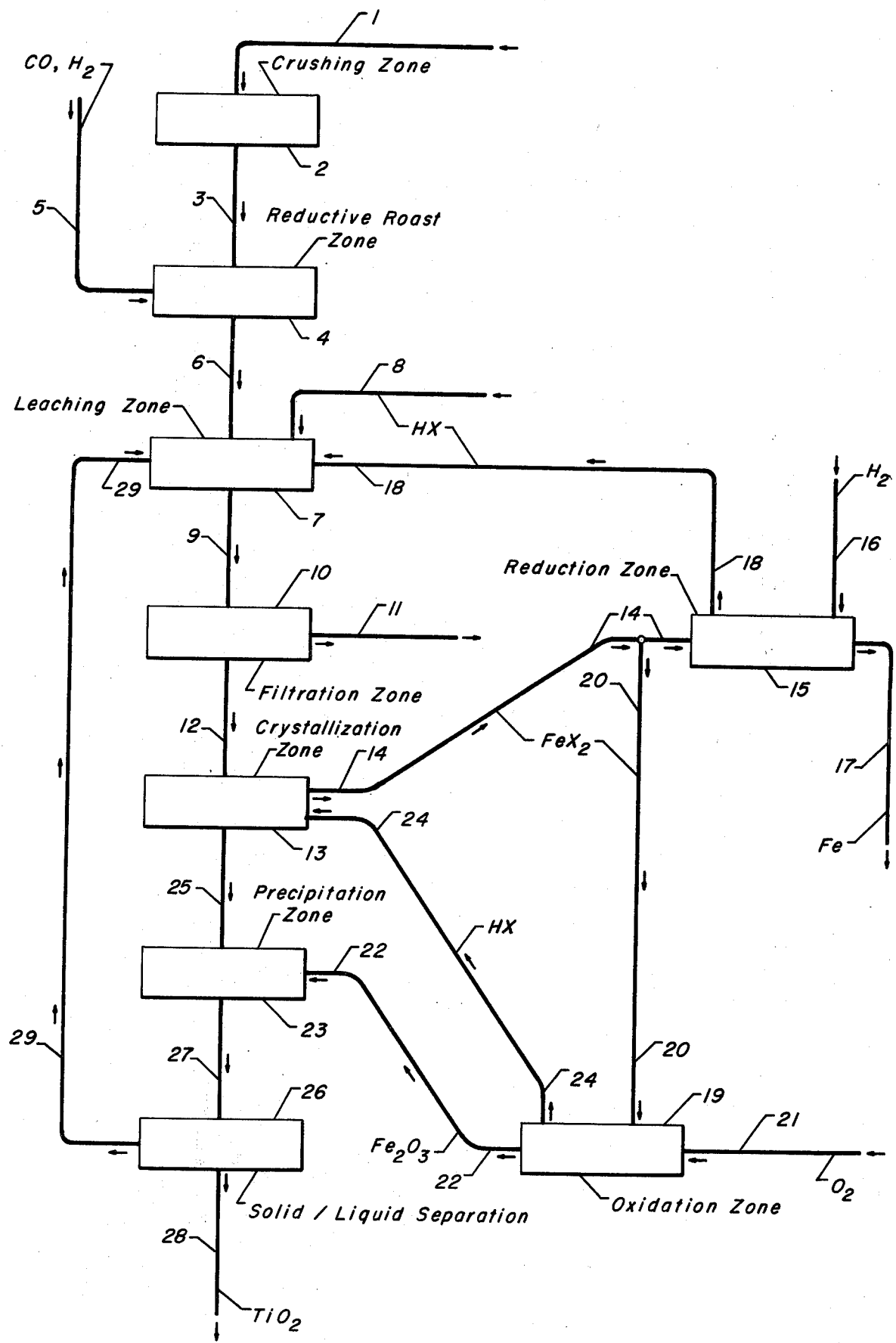

RECOVERY OF IRON AND TITANIUM METAL VALUES

BACKGROUND OF THE INVENTION

Titanium in metallic form or as a compound is an important element in the chemical series. For example, titanium dioxide is utilized in paint pigments, in white rubbers and plastics, floor coverings, glassware and ceramics, painting inks, as an opacifying agent in papers, etc. The other titanium compounds are used in electronics, as fire retardants, waterproofing agents, etc. The metal may be used as such or in alloy form as structural material in aircraft, in jet engines, marine equipment, textile machinery, surgical instruments, orthopedic appliances, sporting equipment, food handling equipment, etc. Heretofore in recovering the titanium from titanium bearing sources such as ilmenite, rutile, etc., the titanium has been subjected to separation steps which involve the formation of titanium as a compound in a valence state of +4, such compounds usually involving titanium oxide. However, when attempting to separate titanium dioxide from impurities which are also contained in the ore such as iron, the hydrolysis of the titanium dioxide at elevated temperatures usually results in also obtaining relatively large amounts of iron along with the titanium.

Heretofore in the prior art various methods have been utilized to recover titanium values from titanium bearing sources. For example, in U.S. Pat. No. 3,236,596 an unroasted ilmenite ore is leached with hydrogen chloride at an elevated temperature. Following this, dissolved iron is reduced with iron or other reductants to precipitate ferrous chloride by saturating the liquor with hydrogen chloride gas. The hydrogen chloride is then extracted from the liquor by a vacuum distillation and the titanium is recovered by conventional means. Likewise, U.S. Pat. No. 3,825,419 reduces an ilmenite ore to produce ferrous oxides. The reduced ore is then leached for about 4 hours under a moderate pressure thereby dissolving the iron in the acid along with about 15% of the titanium. The iron is recovered as ferric oxide containing impurities in the spray roaster while the insoluble product which is primarily titanium dioxide but which contains all of the silica present in the original ore is recovered. U.S. Pat. No. 3,859,077 also discloses a process for recovering titanium in which a titanium tetrahalide is mixed with iron oxide in slag or a titaniferous ore at an extremely high temperature of about 1000° C. to produce volatile impurity chlorides and titanium dioxide. A similar patent, U.S. Pat. No. 3,929,962, also reduces a titanium bearing ore at a high temperature to produce titanium sesquioxide which is in a form whereby it is easier to treat for a titanium-iron separation. Another prior art reference, U.S. Pat. No. 3,903,239 teaches a method for recovering titanium in which unroasted ilmenite is leached over a period of days at room temperature to recover about 80% of the titanium. Sulfur dioxide is added during the leaching to cause a precipitation of the ferrous chloride after which titanium dioxide is recovered by diluting and heating the solution.

In contradistinction to the prior art methods hereinbefore set forth for recovering titanium values from a titanium bearing source, it has now been found possible to recover the iron which is present in the source as well as recovering the titanium metal values.

This invention relates to a process for obtaining both iron metal values and titanium metal values from a bearing source which contains both iron and titanium. More specifically, the invention is concerned with a process for recovering titanium metal values and iron metal values from a titanium bearing source such as ilmenite. The advantages of utilizing the process of the present invention are found in the fact that the reactions may, if so desired, be effected at atmospheric pressure, thus obviating the use of relatively expensive and complicated equipment as well as obtaining a desired yield of titanium metal values using relatively low grade ores as a starting material. Another advantage lies in the additional recovery of iron metal values from the ore in contradistinction to other processes where such values have been lost and not recovered.

It is therefore an object of this invention to provide an improved process for the production of iron metal values and titanium metal values. A further object of this invention is to provide a hydrometallurgical process for obtaining high yields of titanium metal values as well as recovery of iron metal values from bearing sources containing both metals.

In one aspect an embodiment of this invention resides in a process for the recovery of iron values and titanium values from an iron and titanium bearing source which comprises the steps of crushing said source, subjecting said crushed source to a reductive roast at an elevated temperature in a reducing atmosphere, leaching the resultant reduced source with a leach solution comprising a halogen-containing compound to form iron halides and titanium halides, removing insoluble gangue, crystallizing the iron halide in a crystallization zone, separating said solid iron halide from the soluble titanium halide, reducing one portion of said iron halide to form metallic iron and recovering the same, oxidizing the second portion of said iron halide to form iron oxides, contacting said soluble titanium halide with said iron oxides to form solid titanium dioxide and iron halide, and separating and recovering said titanium dioxide.

A specific embodiment of this invention is found in a process for the recovery of iron values and titanium values from ilmenite which comprises the steps of crushing said ilmenite, subjecting said crushed ilmenite to a reductive roast at a temperature in the range of from about 600° to about 900° C. in a reducing atmosphere, leaching the resultant reduced ilmenite with a leach solution comprising hydrogen chloride to form iron chloride and titanium chloride, filtering to remove the insoluble gangue, reducing the temperature to a range of from about ambient to about 90° C. to crystallize the iron chloride, separating the solid iron chloride from the soluble titanium chloride, reducing one portion of the iron chloride at a temperature in the range of from about 600° to about 900° C. to form metallic iron and hydrogen chloride, recycling the hydrogen chloride thus formed to the leach zone for use as a portion of said leach solution, oxidizing the second portion of the iron halide to form iron oxides, contacting the titanium chloride with said iron oxides to form solid titanium dioxide, separating and recovering the titanium dioxide.

Other objects and embodiments will be found in the following further detailed description of the present invention.

As hereinbefore set forth, the present invention is concerned with a process for recovering both iron metal values and titanium metal values from a metal bearing source such as ore including ilmenite, rutile, etc. By utilizing the process of the present invention, it is possible to obtain a high yield of titanium metal values while also obtaining iron metal values which heretofore have not been recovered. The process is effected by crushing an ore source such as ilmenite or other sources such as sand which contains the desired metals, chiefly titanium and iron as well as minor amounts of vanadium, chromium, manganese, etc., to a particle size less than about 35 mesh. Thereafter, the crushed metal bearing source is subjected to a reductive roast at an elevated temperature which will range from about 600° up to about 1000° C. or more and preferably in a range of from about 600° to about 900° C. in the presence of a reducing gas such as hydrogen, carbon monoxide, combinations of carbon monoxide and hydrogen, etc., or any other suitable reductant. The reductive roast is effected for a period of time ranging from about 0.5 up to about 2 hours or more. In the preferred embodiment of the invention, the reducing atmosphere which is used to accomplish the purpose of the roast usually comprises a mixture of about 50% carbon monoxide and 50% hydrogen, with an excess of reductant being utilized in order to completely reduce the iron which is present in the system to the metal. It is also contemplated within the scope of this invention that the crushed ore may be, if so desired, subjected to an oxidation roast prior to the reductive roast, said oxidative roast being accomplished at a temperature in the range of from about 600° to about 900° C. in the presence of an oxidizing atmosphere which is provided for by the presence of air or oxygen. However, it is to be understood that this step is not a necessary part of the present invention. Following the reductive roast of the metal bearing source, the source is then subjected to an aqueous hydrogen halide leach which, in the preferred embodiment of the invention, comprises an aqueous hydrogen chloride leach although other hydrogen halides such as hydrogen bromide and hydrogen iodide may also be utilized although not necessarily with equivalent results. The aforesaid leach of the metal bearing source is usually effected at a temperature which may range from about ambient up to about 110° C., the preferred range being from about 80° to about 100° C., for a period of time ranging from about 0.25 hours up to about 1 hour or more in duration.

Following the leach of the metal bearing source which will form soluble iron halides and titanium halides such as ferrous chloride, titanium trichloride, etc., the mixture is subjected to a separation step in which the solid gangue is separated from the soluble metal chlorides and discarded. The separation of the solid gangue from the soluble metal chlorides may be effected in any suitable manner by means well known in the art, said means including decantation, filtration, etc. The soluble metal halides are then cooled to a temperature sufficient to effect a crystallization or precipitation of the ferrous chloride. For example, the temperature at which the crystallization or precipitation of the ferrous chloride is effected may range from about 0° to slightly in excess of ambient. When utilizing subambient temperatures, the cooled solution is maintained in the subambient range by external means such as an ice bath, cooling coils, etc. After crystallization of the ferrous chloride is completed, the solids are separated from the liquid titanium trichloride by conventional means such as filtration, decantation, etc. A major portion of the solid ferrous chloride after being separated from the titanium trichloride is subjected to a direct reduction step which is effected at an elevated temperature in the range of from about 600° to about 900° C. in contact with an excess of hydrogen. In this direct reduction step, metallic iron is produced which is in the form of powder or crystals and which may be recovered as such. In addition, the hydrogen chloride which is formed during the direct reduction of the ferrous chloride to metallic iron is withdrawn and recycled to the leach step of the process. While a major portion of the ferrous chloride in an amount ranging from 50% to 90% is subjected to this direct reduction, the remaining portion in an amount ranging from about 10% to 50% is subjected to an oxidation step. In the oxidation step the ferrous chloride is treated at an elevated temperature ranging from about 300° to about 700° C. by contact with an oxygen containing gas such as air or oxygen, the preferred oxidizing agent comprising air due to its greater availability and negligible cost. As in the case of the direct reduction any hydrogen chloride which may be formed during the oxidation step is recycled to the ferrous chloride crystallization zone to saturate said zone in order to insure a complete precipitation of the ferrous chloride by reducing the solubility of said compound. In the oxidation zone the reaction of the ferrous chloride with the oxidizing agent results in the formation of iron oxides such as ferrous oxide and ferric oxide. These compounds are then charged to the zone containing the titanium trichloride wherein titanium dioxide is formed. The treatment of the titanium trichloride with the iron oxides is effected at elevated temperatures usually in the range of from about 80° to about 110° C. After precipitation of the titanium dioxide by contact with the iron oxides, the solid titanium dioxide may be separated from the aqueous solution which contains ferrous chloride, the latter being recycled back to the leach zone while the pure titanium dioxide is recovered.

BRIEF DESCRIPTION OF THE DRAWING

The present invention will be further illustrated with reference to the accompanying drawing which sets forth a flow diagram of the process of this invention. It is to be understood that various valves, pumps, heat transfer means, etc., have been eliminated as not being essential to the complete understanding of the invention. However, the utilization of these, as well as other similar appurtenances, will become obvious as the drawing is described.

A titanium and iron bearing source such as ilmenite ore is charged through line 1 to a crushing zone 2. In crushing zone 2 the ilmenite is crushed to a particle size of less than 35 mesh. After reaching the desired particle size, the crushed ore is withdrawn through line 3 and passed to a reductive roast zone 4. In reductive roast zone 4 the crushed ore is contacted with a reductant such as a mixture of carbon monoxide and hydrogen which is passed to zone 4 through line 5. After undergoing the reductive roast for a predetermined period of time in the presence of an excess of the reductant, the source is withdrawn through line 6 and passed to leaching zone 7. As was hereinbefore set forth, it is also contemplated within the scope of this invention that the crushed ore may be subjected to an oxidation step in an oxidation zone not shown in the drawing. However, this step is discretionary in nature and may be omitted if so desired. In leaching zone 7 the reduced ore is leached in contact with an aqueous hydrogen halide, and preferably a hydrogen chloride, leach solution which is passed into zone 7 through line 8. After being leached at a temperature which may range from about ambient to 110° C. for a predetermined period of time the leach solution is withdrawn from zone 7 through line 9 and passed to filtration zone 10. In this zone the solid gangue is separated from the soluble metal halides and withdrawn through line 11 for disposal or, if so desired, recovery of other metals which may have been present in the ore and which have remained insoluble during the leaching step of the process. The soluble metal halides including the iron halides and titanium halides are withdrawn from filtration zone 10 through line 12 and passed to crystallization zone 13. In crystallization zone 13 the ferrous chloride is crystallized due to a temperature drop which is effected by maintaining the crystallization zone at a temperature lower than that found in the leaching zone and filtration zone.

The solid ferrous chloride which crystallizes out of the leach solution is withdrawn through line 14. A major portion of the ferrous chloride, that is, the portion in excess of 50% of the amount withdrawn, is passed to reduction zone 15 wherein it is contacted with an excess of hydrogen which is admitted to reduction zone 15 through line 16. The reduction of the ferrous chloride is effected at elevated temperatures within the range hereinbefore set forth, that is, from about 600° to about 900° C. The metallic iron which is formed during the reduction step of the process is withdrawn from zone 15 through line 17 and passed to storage in either powder or crystalline form. During the reduction of the ferrous chloride, hydrogen chloride which is formed is also withdrawn from reduction zone 15 through line 18 and recycled to leaching zone 7 to form a portion of the leach solution. The minor portion of the ferrous chloride which has been withdrawn from crystallization zone 13 through line 14 is passed to oxidation zone 19 through line 20 wherein it is treated with oxygen which is charged to zone 19 through line 21. The oxidation of the ferrous chloride is also effected at elevated temperatures of from about 300° to about 700° C. In oxidation zone 19 the ferrous chloride is oxidized to iron oxide such as ferrous oxide and ferric oxide which are withdrawn from zone 19 through line 22 and passed to precipitation zone 23. Any hydrogen chloride which is formed in oxidation zone 19 is withdrawn therefrom and recycled back to crystallization zone 13 through line 24. By recycling the hydrogen chloride to crystallization zone 13 the solubility of the ferrous chloride in crystallization zone 13 will be lessened due to the saturation effected by the presence of the excess hydrogen chloride. The leach solution containing soluble titanium trichloride is withdrawn from crystallization zone 13 through line 25 and also passed to precipitation zone 23 wherein it is contacted with the iron oxides. The formation of titanium dioxide which is effected by the treatment of titanium trichloride with the iron oxides is effected at temperatures ranging from about 80° to 110° C. The solution containing the solid titanium dioxide formed in precipitation zone 23 is withdrawn from zone 23 and passed to a solid/liquid separation zone 26 through line 27. In zone 26 the solid titanium dioxide is separated from the barren leach solution and recovered through line 28 while the aforesaid barren leach solution containing ferrous chloride along with some unreacted iron oxides is withdrawn from zone 26 and recycled to leach zone 7 through line 29.

While the aforesaid description is indicative of a batch type operation, it is also contemplated within the scope of this invention to effect the process utilizing a continuous method of operation. This type of operation is effected by continuously feeding the ore which has been crushed in the crushing zone to a reducing roast zone wherein the passage is subjected to a reductive roast utilizing a reductant comprising either hydrogen, carbon monoxide, or a combination thereof which is also continuously charged to this zone. After passage through the zone for a predetermined period of time, the reductant charge is continuously withdrawn and passed to a leaching zone wherein it is subjected to leach treatment with a hydrogen halide such as an aqueous hydrogen chloride solution. After passage through the leaching zone the pregnant leach liquor containing dissolved metal chlorides along with undissolved solids such as gangue, or insoluble metal halides is continuously withdrawn and passed to a filtration zone wherein the soluble metal halides are separated from the solids. After passage through the filtration zone the pregnant leach liquor is continuously passed to a crystallization zone which is maintained at a temperature less than that found in the leaching zone, the ferrous chloride which precipitates out from the crystallization zone is continuously withdrawn, one portion being passed to a reduction zone wherein it is continuously reduced in the presence of an excess of hydrogen. The metallic iron which is formed in this reduction zone is withdrawn and passed to storage while the hydrogen chloride formed during the reduction is recycled to the leaching zone to form a portion of the leach solution. The other portion of the ferrous chloride which has been withdrawn is passed to an oxidation zone wherein it is contacted with an oxygen-containing gas to form iron oxides. After passage through the oxidation zone and formation of the iron oxides the oxides are continuously charged to a precipitation zone wherein they contact the leach liquor containing dissolved titanium trichloride, this compound having been withdrawn from the crystallization zone after separation from the solid ferrous chloride. After contact in the precipitation zone with the attendant formation of titanium dioxide, the solid titanium dioxide and barren leach liquor are continuously withdrawn and passed to a liquid/solid separation zone. The liquid/solid separation zone may comprise a centrifuge or a filtration apparatus whereby the spent leach liquor is continuously withdrawn and recycled to the leaching zone while the desired titanium dioxide is continuously removed therefrom and passed to storage.

The following examples are given for purposes of illustrating the process of this invention. However, it is to be understood that said examples are given merely for purposes of illustration and that the present process is not necessarily limited thereto.

EXAMPLE I

An ilmenite ore may be crushed to −100 mesh and thereafter heated to a temperature of about 750° C. under nitrogen in a rotating quartz furnace tube. Thereafter the ore may be reduced by being subjected to a flow of a mixture of hydrogen and carbon monoxide gas which may be passed through the tube at a rate of about 640 $cm^3$/min. for each 100 grams of ilmenite for a period of 1 hour while maintaining the temperature of the tube at about 750° C. At the end of this 1 hour period the tube and sample contained therein may be cooled under nitrogen to room temperature. Thereafter 50 grams of the reduced ilmenite was added to 250 ml of boiling hydrochloric acid. The reaction was maintained at a temperature in the range of 95° to 105° C. and allowed to react for a period of 1.5 hours. At the end of the 1.5 hour period the mixture was filtered to remove insoluble gangue material and the filtrate was poured into a glass bubbler. The bubbler was then cooled in an ice bath at a temperature of about 5° C. for a period of 1 hour while bubbling hydrogen chloride gas through the sample solution. Ferrous chloride crystals precipitated out and after a period of 1 hour the crystals were separated from the leach solution and washed with acetone.

The ferrous chloride crystals were dried at a temperature of 110° C. in an air atmosphere, ground to −35 mesh and placed in a quartz tube. In addition, steel wool was added as a support to prevent the iron from nucleating on the tube during the reduction as well as to prevent balling and sticking of the ferrous chloride. Thereafter the tube was slowly heated to a temperature of 800° C. under a flow of hydrogen gas and was maintained at this temperature for a period of 3 hours under a hydrogen flow. At the end of this time heating was discontinued and it was found that the steel wool had compressed into a long thin cylinder. The metallic iron which was recovered inside the cylinder was powdery in nature while the outside of the cylinder was coated with cubic crystals of iron.

Another portion of the ferrous chloride which had been washed with acetone was dried at a temperature of 400° C. in a fluid bed reactor and thereafter roasted at a temperature of 800° C. using dry air as the fluidizing gas. X-ray defraction of the product disclosed that only ferric oxide was present.

The ferric oxide which was produced during the preceding paragraph may then be used to treat the leach solution which may be separated from the crystallized ferrous chloride by adding the ferric oxide to the leach solution and heating to a temperature of about 100° C. for a period of 1 hour. The titanium dioxide which may be produced during this period may then be filtered from the leach solution which may be used as a portion of the leaching material to treat the ilmenite ore which has been obtained in the reductive roast step.

EXAMPLE II

In a manner similar to that set forth in Example I above, an ilmenite ore may be crushed to −100 mesh and the crushed ore then heated to a temperature of 750° C. The reduction of the crushed ore may be effected by treating said ore for a period of 1 hour at this temperature using 320 cm$^3$/min. each of hydrogen and carbon monoxide per 100 grams of ilmenite. Following this the reduced ilmenite may be admixed with concentrated hydrochloric acid and heated to a temperature of 100° C. for a period of 15 minutes to effect a leach of the ore. At the end of the leach period the solution may be filtered to remove insoluble gangue. The solution may then be cooled by means of an ice bath to a temperature of 5° C. and maintained thereat for a period of 1 hour while bubbling hydrogen chloride gas through the sample solution. Ferrous chloride crystals will precipitate out of the cool solution and after separation from the leach solution containing soluble titanium trichloride may be recovered and washed with acetone.

A portion of the ferrous chloride crystals may then be roasted in a quartz tube at a temperature of 800° C. for a period of 4 hours under a hydrogen atmosphere. The resultant metallic iron which results from the reduction period may be recovered while the hydrogen chloride which is formed during the reduction may be recycled back to the leaching zone for use as a portion of the leach solution.

The other portion of the ferrous chloride crystals may then be dried at a temperature of about 400° C. and thereafter roasted at a temperature of about 800° C. under an air atmosphere. The ferric oxide which is produced by the oxidation may then be used to treat the soluble titanium trichloride while any hydrogen chloride which is produced during the oxidation reaction is recycled to the cool crystallization zone for use as a saturating agent in the precipitation of ferrous chloride. The treatment of the titanium trichloride with the ferrous oxide may be effected at a temperature of about 90° C. for a period of ½ hour. At the end of this period the solid titanium dioxide which is formed may be filtered and separated from the barren leach liquor which may be recycled back to the leaching zone while the titanium dioxide is recovered.

I claim as my invention:

1. A process for the recovery of iron values and titanium values from ilmenite which comprises the steps of:
   (a) crushing said ilmenite;
   (b) subjecting said crushed ilmenite to a reductive roast at a temperature of from about 600° to about 1000° C. in the presence of hydrogen, carbon monoxide, or a mixture of carbon monoxide and hydrogen;
   (c) leaching the resultant reduced ilmenite with a leach solution comprising hydrogen chloride to form iron chlorides and titanium chlorides;
   (d) removing insoluble gangue;
   (e) cooling the soluble metal chlorides sufficiently to crystallize the iron chloride;
   (f) separating the solid iron halide from the soluble titanium chloride;
   (g) reducing a major portion of said iron chloride to form metallic iron hydrogen chloride, and recovering the metallic iron;
   (h) oxidizing the other portion of said iron chloride to form ferric oxide;
   (i) contacting said soluble titanium chloride with said ferric oxide to precipitate solid titanium dioxide; and
   (j) separating and recovering said titanium dioxide.

2. The process as set forth in claim 1 in which said reductive roast is effected at a temperature in the range of from about 600° to about 900° C.

3. The process as set forth in claim 1 in which said iron chloride is crystallized at a temperature in the range of from about ambient to about 90° C.

4. The process as set forth in claim 1 in which the reduction of said iron chloride is effected at a temperature in the range of from about 600° to about 900° C.

5. The process as set forth in claim 4 in which hydrogen chloride formed by the reduction of said iron chloride is recycled to the leaching step for use as a portion of said leach solution.

6. The process as set forth in claim 1 in which the oxidation of said iron chloride is effected by treatment with an oxygen-containing compound at a temperature in the range of from about 300° to about 700° C.

7. The process as set forth in claim 6 in which hydrogen chloride which is formed during the oxidation of said iron chloride is recycled to the iron halide crystallization step.

8. The process as set forth in claim 1 in which the precipitation of said solid titanium dioxide is effected at a temperature in the range of from about 80° to about 110° C.

9. The process as set forth in claim 1 in which soluble iron compounds which are separated from the solid titanium dioxide are recycled to said leaching step.

* * * * *